US011894649B2

(12) United States Patent
Simonds

(10) Patent No.: US 11,894,649 B2
(45) Date of Patent: Feb. 6, 2024

(54) ELECTRICAL CONNECTOR AND METHOD OF MAKING THE SAME

(71) Applicant: Amphenol Corporation, Wallingford, CT (US)

(72) Inventor: Matthew Robert Simonds, Conklin, NY (US)

(73) Assignee: Amphenol Corporation, Wallingford, CT (US)

( * ) Notice: Subject to any disclaimer, the term of this patent is extended or adjusted under 35 U.S.C. 154(b) by 677 days.

(21) Appl. No.: 17/085,633

(22) Filed: Oct. 30, 2020

(65) Prior Publication Data

US 2022/0140559 A1 May 5, 2022

(51) Int. Cl.
*H01R 43/24* (2006.01)
*H01R 13/405* (2006.01)
*H01R 13/504* (2006.01)

(52) U.S. Cl.
CPC ........... *H01R 43/24* (2013.01); *H01R 13/405* (2013.01); *H01R 13/504* (2013.01)

(58) Field of Classification Search
None
See application file for complete search history.

(56) References Cited

U.S. PATENT DOCUMENTS 2,857,626 A 10/1958 Wagner et al.
3,806,630 A 4/1974 Thompson et al.
4,070,543 A 1/1978 Thompson et al.
4,693,534 A 9/1987 Clark
4,795,372 A 1/1989 Kobler
5,006,286 A 4/1991 Dery et al.
5,113,037 A 5/1992 King, Jr. et al.
5,274,917 A * 1/1994 Corbett, III ............ H01R 43/24 29/860
5,510,405 A 4/1996 Heucher et al.
5,641,307 A 6/1997 Gerrans
7,445,481 B2 11/2008 Nagashima et al.
(Continued)

FOREIGN PATENT DOCUMENTS

CN 104682156 A 6/2015
EP 0187381 A3 7/1986
(Continued)

OTHER PUBLICATIONS

Cinch Connectivity Solutions C-NTV Series, D38999 Connector with PC Tail Contacts; 4 pages; 2015.

*Primary Examiner* — Jacob T Minskey
*Assistant Examiner* — Adrien J Bernard
(74) *Attorney, Agent, or Firm* — CANTOR COLBURN LLP

(57) ABSTRACT

Electrical connectors and methods of making the connectors. The method steps include inserting one or more contacts into a temporary contact holder; removably coupling the contact holder with a connector housing, thereby creating a pour receiving cavity inside of the housing; adding a flowable curable material into the cavity to at least partially fill the cavity and surround at least part of the contacts residing in the connector housing; and removing the contact holder from the connector housing, thereby leaving mating contact ends of the one or more contacts exposed and leaving the mating contact ends set in the ready position for mating with a complementary connector.

28 Claims, 4 Drawing Sheets

(56) References Cited

U.S. PATENT DOCUMENTS

| | | | |
|---|---|---|---|
| 9,368,905 | B2 | 6/2016 | Ledgerwood et al. |
| 10,014,613 | B2 | 7/2018 | Cheney et al. |

FOREIGN PATENT DOCUMENTS

| | | | |
|---|---|---|---|
| EP | 0272039 | A2 | 6/1988 |
| EP | 0718924 | A2 | 8/1997 |
| GB | 955432 | | 4/1964 |
| GB | 1373025 | | 11/1974 |
| GB | 1453306 | | 10/1976 |
| GB | 2465145 | A | 5/2010 |
| WO | WO 95/17756 | | 6/1995 |
| WO | WO 2019/149795 | A1 | 8/2019 |

* cited by examiner

ELECTRICAL CONNECTOR AND METHOD OF MAKING THE SAME

BACKGROUND

The disclosure relates generally to electrical connectors and improved methods for making the same.

Conventional electrical connectors require many steps to be made. For example, conventional electrical connectors typically include several separate insert components for holding its contact, e.g. grommets and front and rear insert portions, that must be assembled. In addition, once the insert components is assembled, the assembled insert must then by inserted into the shell of the connector. These inserts and insert components also often have leakage points, such as air gaps, that particularly increase the risk of electrical shorting.

SUMMARY

An aspect of this disclosure is a method of making an electrical connector the comprises the steps of inserting one or more contacts into a temporary contact holder that is configured to temporarily hold the one or more contacts in an orientation such that the one or more contacts are arranged in a ready position for mating with a complementary connector; removably coupling the temporary contact holder with a connector housing, thereby creating a pour receiving cavity inside of the connector housing; adding, e.g. by pouring or injecting, a flowable curable material into the pour receiving cavity to at least partially fill the pour receiving cavity and surround at least part of the one or more contacts that extend through the pour receiving cavity with termination contacts ends of the one or more contacts being exposed; and removing the temporary contact holder from the connector housing, thereby leaving mating contact ends of the one or more contacts exposed inside of the connector housing and set in the ready position.

In certain examples, the flowable curable material is dielectric; the flowable curable material is silicone; the flowable curable material is conductive or semi-conductive; at least one retaining groove is disposed in an inner surface of the connector housing which forms part of the pour receiving cavity; the temporary contact holder has one or more passageways each configured to receive the mating contact end of the one or more contacts; and/or the connector housing is metal or plastic and the temporary contact holder is metal or plastic.

In other examples, the step of removably coupling the temporary contact holder to the connector housing occurs after the one or more contacts are inserted into the temporary contact holder; a sealing member is located between the temporary contact holder and the connector housing at a bottom of the pour receiving cavity; a sealing member forms part of the temporary contact holder; the step of removing the temporary contact holder from the connector housing occurs after curing of the flowable curable material in the pour receiving cavity; the temporary contact holder includes one or more alignment elements, such as ribs, that are configured to engage corresponding one or more alignment elements, such as keyways, of the first end of the connector housing; and/or the connector housing has a substantially cylindrical shape and the pour receiving cavity extends generally between a middle of the connector housing and the second end thereof.

In an example, an electrical connector is made according to the steps described above.

Another aspect of this disclosure is a method of making an electrical connector that comprises the steps of inserting one or more contacts into a temporary contact holder that is configured to temporarily hold the one or more contacts in an orientation such that the one or more contacts are arranged in a ready position for mating with a complementary connector; placing a front end of a connector housing over at least a portion of the temporary contact holder, thereby creating a pour receiving cavity inside of the connector housing, wherein mating end portions of the one or more contacts held in the temporary contact holder extend through the pour receiving cavity in a ready position for mating with a complementary connector; sealing the connector housing to the temporary contact holder; after sealing the connector housing to the temporary contact holder, adding, e.g. by pouring or injecting, a flowable curable material into a top end of the connector housing and into the pour receiving cavity to at least partially fill the pour receiving cavity and surround at least part of the one or more contacts that extend through the pour receiving cavity with that termination contacts ends of the one or more contacts being exposed; and removing the temporary contact holder from the front end of the connector housing, thereby leaving mating contact ends of the one or more contacts exposed inside the connector housing in the ready position.

In some examples, the step of sealing the connector housing to the temporary contact holder includes compressing a sealing member between the connector housing and the temporary contact holder; the sealing member forms part of the temporary contact holder; the method further comprises the step of curing the flowable curable material that has been poured or injected into the pour receiving cavity; and removing the temporary contact holder from the connector housing after the flowable curable material is cured; and/or the flowable curable material is dielectric, conductive, or semi-conductive.

In an example, an electrical connector is formed by the steps described above.

Yet another aspect of this disclosure is a method of making an electrical connector, that comprises the steps of selecting a connector housing for the electrical connector, the connector housing having opposite first and second ends; inserting one or more contacts into a temporary contact holder that is configured to temporarily hold the one or more contacts in an orientation such that the one or more contacts are arranged in a ready position for mating with a complementary connector; removably coupling the first end of the connector housing over the at least a portion of the temporary contact holder in an interference fit, thereby creating a pour receiving cavity inside of the connector housing between the first and second ends thereof; sealing the connector housing to the temporary contact holder when removably coupling the first end of the connector housing with the temporary contact holder; after sealing the connector housing to the temporary contact holder, adding, e.g. by pouring or injecting, a flowable curable material into a top end of the connector housing and into the pour receiving cavity to at least partially fill the pour receiving cavity and surround at least part of the one or more contacts that extend through the pour receiving cavity such that termination contacts ends of the one or more contacts are exposed; and removing the temporary contact holder from the first end of the connector housing, thereby leaving mating contact ends of the one or more contacts exposed inside the connector housing in the ready position.

In certain examples, the method further comprises the step of molding the temporary contact holder such that the at least a portion of the temporary contact holder is sized and shaped to be tightly received in the first end of the connector housing; the step of sealing the connector housing to the temporary contact holder includes compressing a sealing member between the connector housing and the temporary contact holder; the method further comprises the step of curing the flowable curable material that has been poured or injected into the pour receiving cavity; and removing the temporary contact holder from the connector housing after the flowable curable material is cured; the method further comprises the step of reusing the contact holder to make another electrical connector.

This summary is not intended to identify essential features of the claimed subject matter, nor is it intended for use in determining the scope of the claimed subject matter. It is to be understood that both the foregoing general description and the following detailed description are exemplary and are intended to provide an overview or framework to understand the nature and character of the disclosure.

BRIEF DESCRIPTION OF THE FIGURES

The accompanying drawings are incorporated in and constitute a part of this specification. It is to be understood that the drawings illustrate only some examples of the disclosure and other examples or combinations of various examples that are not specifically illustrated in the figures may still fall within the scope of this disclosure. Examples will now be described with additional detail through the use of the drawings, in which.

DETAILED DESCRIPTION

Figure 1A:
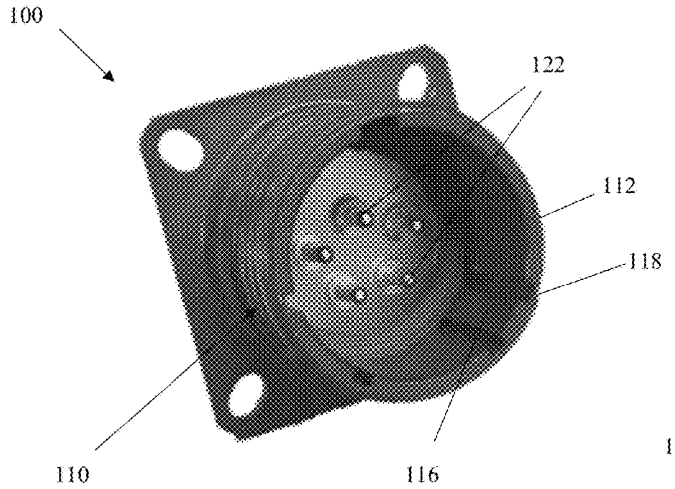
FIGS. 1A and 1B are front and rear perspective views, respectively, of an exemplary electrical connector, according to an example of the present disclosure.

The present disclosure generally relates to electrical connectors and methods of making the same. An exemplary method comprises the steps of inserting one or more contacts into a temporary contact holder that is configured to temporarily hold the one or more contacts in an orientation such that the one or more contacts are arranged in a ready position for mating with a complementary connector; removably coupling the temporary contact holder with a connector housing, thereby creating a pour receiving cavity inside of the connector housing; adding, e.g. by pouring or injecting, a flowable curable material, such as a liquid elastomer or epoxy, into the pour receiving cavity to at least partially fill the pour receiving cavity and surround at least part of the one or more contacts that extend through the pour receiving cavity with termination contacts ends of the one or more contacts being exposed; and removing the temporary contact holder from the connector housing, thereby leaving mating contact ends of the one or more contacts exposed in the ready position.

In an example of the present disclosure, the poured elastomer or epoxy is cured before removing the temporary contact holder. In another example, the connector housing is sealed to the contact holder prior to pouring the flowable curable material. In yet another example, once the contact holder is removed from the connector housing, the contact holder can be reused to make another connector. In addition, the poured elastomer or epoxy self-levels to form an environmental seal between the connector housing and the elastomer material in the cavity when cured, and between the contacts and the cured elastomer material. The elimination of plastic to plastic bonds provided by the present disclosure increases electrical performance by eliminating leakage paths.

The methods of the present disclosure may eliminate the need to manufacture multiple insert components, such as the grommet, rear insert, and front insert; may eliminate the step of bonding the rear insert to the front insert, and the insert subassembly to the grommet; and may eliminate the step of inserting the insert subassembly into the connector housing. The elimination of components and assembly steps significantly reduces manufacturing time of the connector. And the ability to use and reuse contact holders further reduces manufacturing time. Additionally, by eliminating injection molded parts and with the ability to use one-piece molds for making the electrical connector, modifications and custom inserts are possible without major investments in several injection molds as is commonly required. Also, the decrease in manufacturing time compared to other connector products, particularly in the military/aerospace connector industry, brings significant value for customers requiring parts fast. And the decrease in manufacturing steps reduces the risk of manufacturing fallout or quality issues.

The temporary contact holder can utilize the connector's sealing member, such as a gasket, or the temporary contact holder can have its own gasket, to prevent silicone leakage between shell and contact holder. In addition, the contact holder organizes the connector's contacts/conductors during the elastomer pour and during curing. Interference fit between conductors and the contact holder prevent leakage of the flowable material, such as silicone. The silicone can be filled until reaching the rear or near the rear of the connector housing, eliminating molding and assembly operations typical in connector.

Figure 1B:
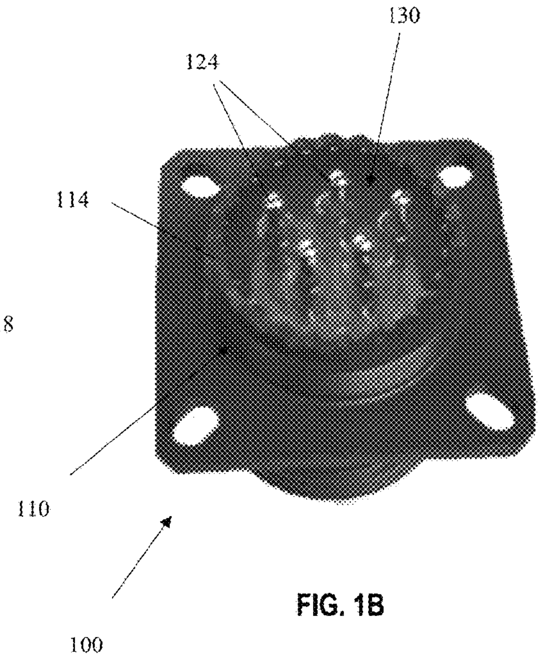

Referring to FIGS. 1A and 1B, an exemplary electrical connector 100 of the present disclosure generally includes connector housing or shell 110 that supports one or more electrical contacts 120. The housing 110 has opposite first and second ends 112 and 114 and inner bore that defines the inner surface 116 of the housing 110. The first end 112 of the housing 110 may be the front of the connector 100 which interfaces with another or complementary connector and the second end may be the rear of the connector 100. Each contact 120 has a mating contact end 122 (FIG. 1A) associated with the front of the connector 100 and a termination contact end 124 (FIG. 1B) associated with the rear of the connector 100 for terminating to a printed circuit board, for example. Alternatively, the termination contact ends 124 can be configured for terminating to cabling. Although the contacts 120 are shown as PCB contacts which get installed into a printed circuit board, the contacts 120 can use other contact termination methods such as solder cups, flat lugs, threaded termination, and the like. A flowable curable material 130 is cured inside of the connector housing 100 and around the contacts 120, thereby creating an environmentally sealed connector. The flowable curable material 130 is a liquid material with any viscosity, i.e. ranging from low to high viscosity, that is capable of being poured or injected for eventual curing. For example, the flowable curable material 130 can be a very low viscosity epoxy or a very high viscosity silicone.

Figure 2:
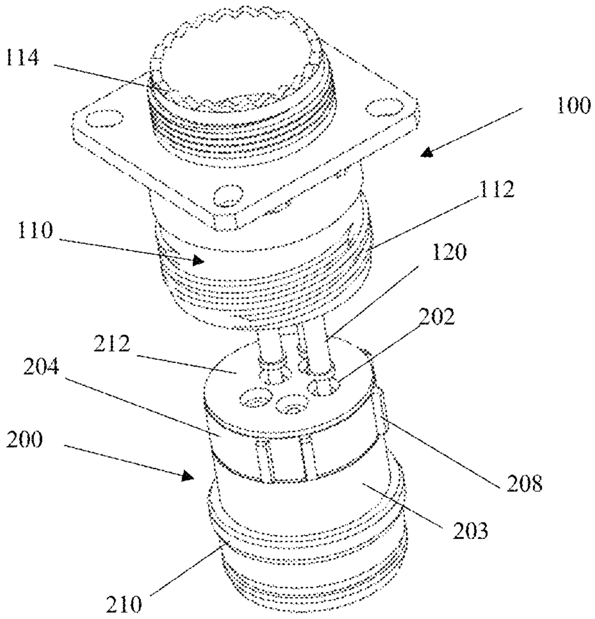
FIG. 2 is an exploded perspective view of the electrical connector illustrated in FIGS. 1A and 1B and a temporary contact holder used in making the connector, according to an example of the present disclosure.
Figures 4A, 4B, 4C, 4D:
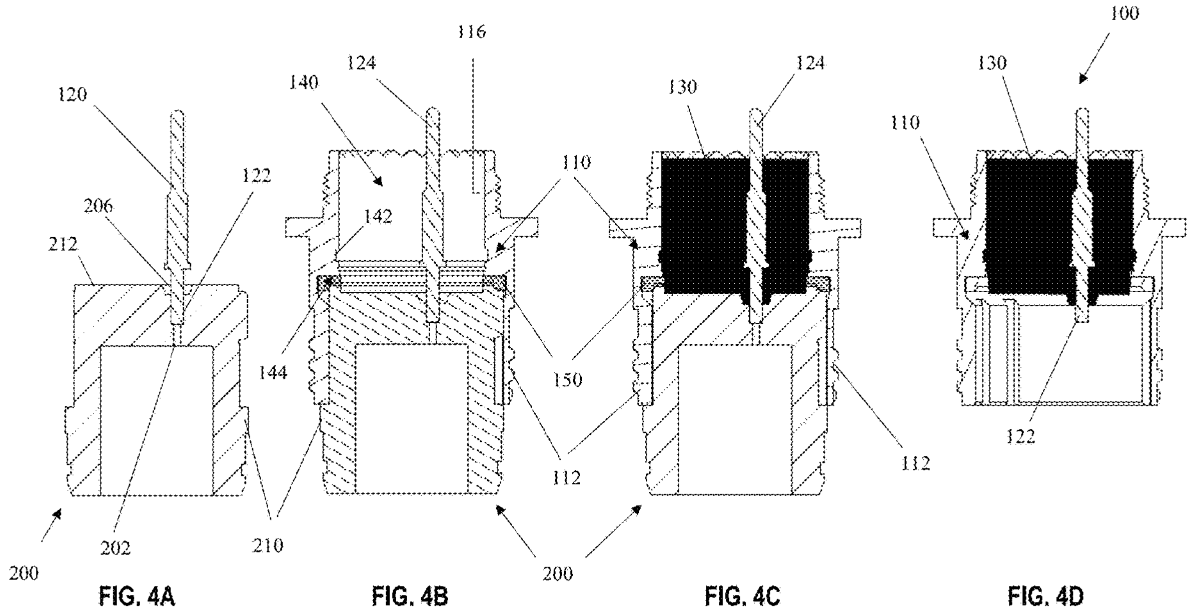
FIGS. 4A-4D are cross-sectional views illustrating exemplary method steps for making the electrical connector illustrated in FIGS. 1A and 1B, according to an example of the present disclosure.

A temporary contact holder 200 is used to make the connector 100, as seen in FIG. 2. The contact holder 200 is designed and shaped to temporarily hold the individual contacts 120 with the contacts 120 being in an orientation such that the contacts are arranged in a ready position for mating or connecting with a complementary connector and a PCB, or alternatively connecting with a complementary connector and cabling. Each contact 120 may be held in a passageway 202 in the body 203 of the temporary contact holder 200. The contact holder's body 203 has an insertion portion 204 sized and shaped to tightly fit within the first end 112 of the housing 110. Each passageway 202 can have a recess 206, that is open at the end face of the insertion portion 204 with a generally cone shape, as best seen in FIG. 4A, to create a sealing member, such as an interfacial seal, which will create a "tower" which seals the interface between the contacts, e.g. pin and socket, of the mating connectors. The shape of the recess 206 can also facilitate insertion of the individual contacts 120 in the passageways 202.

In an example, the housing 110 is generally cylindrical in shape and as such the insertion portion 204 of the temporary contact holder 200 has a corresponding generally cylindrical shape. One or more alignment elements, such as ribs 208, may be provided on the outer surface of the insertion portion 204 of the contact holder 200 which act as keys that align the contact holder 200 with corresponding keyways 118 (FIG. 1A) of the housing 110. This ensures the contacts 120 are cured in the proper orientation related to the keyways in the housing 110. The body 203 of the contact holder 200 can have an outwardly extending abutment shoulder 210 spaced from the insertion portion 204 that acts as a stop against the end face of the housing's first end 112 for proper insertion depth of the insertion portion 204 into the housing 110.

In an example, a mold is used to form and shape the temporary contact holder 200. The mold can be formed by any known manner, such as by machining like 3D printing, for example. The contact holder 200 can be formed of a plastic material to facilitate the coupling or insertion of the contact holder's insertion portion 204 into the connector housing 110 which is metal.

FIGS. 4A thru 4D illustrate exemplary method steps for making the electrical connector 100, according to the present disclosure. As seen in FIG. 4A, the individual contacts 120 are inserted into the respective passageways 202 of the contact holder 200 to temporarily hold the one or more contacts. The mating contact end 122 of each contact 120 can be inserted into the respective passageway 202 at the top face 212 (FIG. 2) of the contact holder 200 leaving the remainder of the contact 120 outside of the contact holder 200. The cone shape of the recess 206 facilitates insertion of the mating contact end 122 into the passageway 202.

As seen in FIG. 4B, the first end 112 of the connector housing 110 is placed over or receives the insertion portion 204 of the temporary contact holder 200, such that keyways 118 align with ribs 208, thereby removably coupling the connector housing 110 and the contact holder 200. In an example, the contact holder 200 and the first end 112 of the housing 110 are removably coupled via an interference fit. A sealing member 150, such as a rubber gasket, may be located inside of the housing 110 that when inserting the contact holder 200 into the housing 110, the housing 110 may be pushed down such that the sealing member 150 is sandwiched or compressed between the top face 212 (FIG. 4A) of the contact holder 200 and an inner ledge 144 (FIG. 4B) of the housing 110 to create a seal therebetween.

Figure 3:
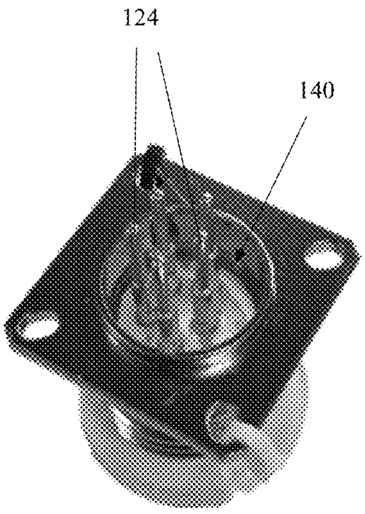
FIG. 3 is a front perspective view similar to FIG. 1A of the electrical connector, showing the connector prior to adding a cold pour thereto when making the connector.

Once the insertion portion 204 of the temporary contact holder 200 is inserted into the housing's first end 112 to a proper depth therein, a pour receiving cavity 140 is created within the inner bore of the housing 110 between a middle of the housing and its second end 114. FIGS. 3 and 4B show the pour receiving cavity 140 empty with an open top prior to adding the flowable material 130 thereto. The bottom of the cavity 140 is defined by the top face 212 of the contact holder 200 and the sides of the cavity 140 are defined by the inner surface 116 of the housing 110. The contacts 120, temporarily supported by the contact holder 200, extend through the pour receiving cavity 140. In an example, the termination ends 124 of the contacts 120 can extend beyond and outside of the second end 114 of the connector housing 110, as seen in FIG. 4C. One or more retaining grooves 142 can be disposed in the inner surface 116 of the connector housing 100. The groove 142 forms part of the pour receiving cavity 140 to secure the flowable material 130 inside of the housing 110 once the flowable material 130 is cured, as seen in FIG. 4D.

In an alternative example, the contacts 120 may be inserted into the temporary contact holder 200, as described above, after the contact holder 200 is inserted into and removably coupled with the connector housing's first end 112 rather than before.

The pour receiving cavity 140 is configured to receive the flowable curable material 130 for surrounding, sealing, and setting the contacts 120 in the ready position in-situ or inside of the housing 100. As seen in FIG. 4C, once the temporary contact holder 200, with the contacts 120, is removably coupled to the connector housing 110 to create the sealed pour receiving cavity 140, the flowable curable material 130 can be added to the pour receiving cavity 140 to fill the same. The cavity 140 can be entirely or substantially entirely filled, as seen in FIG. 4C, or only partially filling, to reduce the weight of the connector, for example.

The flowable curable material 130 can fill the pour receiving cavity 140 by pouring, e.g. via a cold pour process, or injecting, e.g. an injection molding process, the flowable material 130. A cold pour process uses materials which do not require vulcanization to cure, such as silicones and the like. The cold pour material would be poured into the cavity 140 and filled by gravity. An injection molding process can simply inject the material using a tool, such as a syringe, into the cavity 140. Injection molding can also be done using pressure to force material through a channel or small opening, for example, and into the cavity 140. This process is used for curable materials with high viscosity. The flowable curable material 130 can be any material used in a cold pour or injection molding process, including materials which cure at room temperature, materials that cure with heat, or materials which cure with vulcanization. The flowable curable material 130 can be dielectric, conductive, or semiconductive. Example materials for the flowable curable material 130 include, but are not limited to, silicone, urethane, epoxy, and the like.

The flowable material 130, when added to the pour receiving cavity 140, will self-level therein and around the contacts 120, which removes leakage points, thus improving the hermiticity of the connector 100. This reduces the risk for electrical shorting via airgaps at higher voltages, thus increasing electrical performance. The termination ends 124 of the contacts 120 remain exposed, that is the termination ends 124 extend beyond the flowable material 130 received in the cavity 140 such that the ends 124 are not covered by the flowable material 130 and are exposed for termination to a printed circuit board, cabling, or the like. In an example, the flowable material 130 can be silicone that flows into the groove 142 of the inner surface 116 of the housing 110 to retain the poured silicone inside the housing 110, while the flow of the silicone around the contacts 120 retains them inside of the poured silicone.

The flowable material 130 can then be cured while inside of the housing 110 in the pour receiving cavity 140. The termination ends 124 of the contacts 120 remain exposed either inside the housing 110 or outside of the housing, as seen in FIG. 4C. Once the flowable material 130 has cured to set the contacts 120 in their ready position for mating, the temporary contact holder 200 is removed, as seen in FIG. 4D, leaving the mating contact ends 122 exposed for mating and the assembly of the electrical connector 100 is complete. The contact holder 200 can then be reused to make another electrical connector in a similar manner to that described above.

Figures 5A, 5B, 5C, 5D:
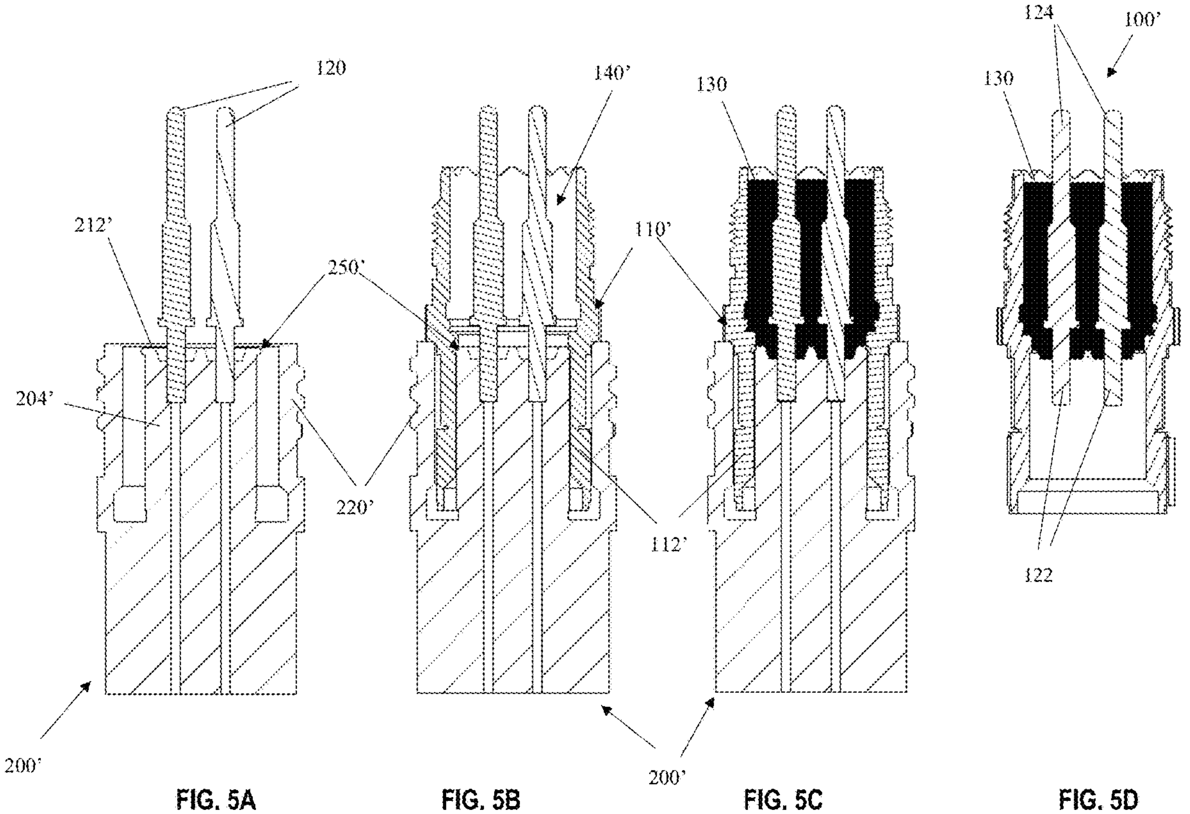
FIGS. 5A-5D are cross-sectional views illustrating alternative exemplary method steps for making an electrical connector, according to another example of the present disclosure.

FIGS. 5A thru 5D illustrate another exemplary electrical connector 100' and exemplary method steps for making the same, according to another example of the present disclosure. The method steps of FIG. 5A thru 5D are substantially the same as those of FIGS. 4A thru 4D, except that the sealing member 250' for keeping the flowable material 130 from leaking, is incorporated into the temporary contact holder 200' rather than the sealing member being located inside of the connector's housing. The sealing member 250' may be in the form of an outer lip at the top face 212' of the contact holder 200', as best seen in FIG. 5A. The lip 250' may be integrally formed with the insertion portion 204' of the contact holder 200' or can be a separated piece that is attached to the contact holder 200'.

As seen in FIG. 5A, the contacts 120 are inserted into the temporary contact holder 200' in a manner similar to that described above regarding FIG. 4A. As seen in FIG. 5B, the contact holder 200' is removably coupled with of the connector housing 110' by placing the housing's first end 112' over the insertion portion 204' of the contact holder 200' such that the sealing member 250' engages the inner surface of the housing's first end 112', such as by an interference or press fit. The contact holder 200' can have an outer cylinder 220' outside of the insertion portion 204' to assist with alignment and engagement between the contact holder 200' and the housing 110', as seen in FIG. 5B.

The flowable material 130 can then be added to the pour receiving cavity 140' and cured, as seen in FIGS. 5C and 5D in the same manner as described above regarding FIGS. 4C and 4D. Once removed from the housing 110', the temporary contact holder 202' can be reused to make another electrical connector.

It will be apparent to those skilled in the art having the benefit of the teachings presented in the foregoing descriptions and the associated drawings that modifications, combinations, sub-combinations, and variations can be made without departing from the spirit or scope of this disclosure. Likewise, the various examples described may be used individually or in combination with other examples. Those skilled in the art will appreciate various combinations of examples not specifically described or illustrated herein that are still within the scope of this disclosure. In this respect, it is to be understood that the disclosure is not limited to the specific examples set forth and the examples of the disclosure are intended to be illustrative, not limiting.

In an example, the electrical connectors made by the methods of the present disclosure can be military and aerospace electrical connectors with printed circuit tail contacts or solder cup termination contacts; or can be hermetic connectors, for applications requiring a hermetic seal or an 1P-68 or greater water seal; or can be used for high temperature applications. By eliminating the multiple insert components typically manufactured with temperature limitations, high temperature materials, such as silicones, can be to increase the performance of the electrical connector.

As used in this specification and the appended claims, the singular forms "a", "an" and "the" include plural referents, unless the context clearly dictates otherwise. Similarly, the adjective "another," when used to introduce an element, is intended to mean one or more elements. The terms "comprising," "including," "having" and similar terms are intended to be inclusive such that there may be additional elements other than the listed elements.

Additionally, where a method described above or a method claim below does not explicitly require an order to be followed by its steps or an order is otherwise not required based on the description or claim language, it is not intended that any particular order be inferred. Likewise, where a method claim below does not explicitly recite a step mentioned in the description above, it should not be assumed that the step is required by the claim.

It is noted that the description and claims may use geometric or relational terms, such as above, below, upper, lower, top, bottom, linear, arcuate, elongated, parallel, perpendicular, etc. These terms are not intended to limit the disclosure and, in general, are used for convenience to facilitate the description based on the examples shown in the figures. In addition, the geometric or relational terms may not be exact. For instance, walls may not be exactly perpendicular or parallel to one another because of, for example, roughness of surfaces, tolerances allowed in manufacturing, etc., but may still be considered to be perpendicular or parallel.

What is claimed is:

1. A method of making an electrical connector, comprising the steps of:

inserting one or more contacts into a temporary contact holder prior to removably coupling the temporary contact holder to a connector housing, the temporary contact holder configured to temporarily hold the one or more contacts in an orientation such that the one or more contacts are arranged in a ready position for mating with a complementary connector;

removably coupling the temporary contact holder with a connector housing, thereby creating a pour receiving cavity inside of the connector housing;

adding a flowable curable material into the pour receiving cavity to at least partially fill the pour receiving cavity and surround at least part of the one or more contacts that extend through the pour receiving cavity with termination contacts ends of the one or more contacts being exposed; and removing the temporary contact holder from the connector housing, thereby leaving mating contact ends of the one or more contacts exposed and set in the ready position for mating.

2. The method of claim 1, wherein the step of adding the flowable curable material into the pour receiving cavity includes pouring or injecting the flowable curable material into the pour receiving cavity.

3. The method of claim 2, wherein the flowable curable material is silicone.

4. The method of claim 1, wherein the flowable curable material is dielectric, conductive or semi-conductive.

5. The method of claim 1, wherein an inner surface of the connector housing comprises at least one retaining groove which forms part of the pour receiving cavity.

6. The method of claim 1, wherein the temporary contact holder has one or more passageways each configured to receive the mating contact end of the one or more contacts.

7. The method of claim 1, wherein the connector housing is metal and the temporary contact holder is plastic.

8. The method of claim 1, wherein the step of removably coupling the temporary contact holder to the connector housing occurs after the one or more contacts are inserted into the temporary contact holder.

9. The method claim 1, wherein a sealing member is located between the temporary contact holder and the connector housing at a bottom of the pour receiving cavity.

10. The method of claim 1, wherein a sealing member forms part of the temporary contact holder.

11. The method of claim 1, further comprising the step of curing the flowable curable material , wherein the step of removing the temporary contact holder from the connector housing occurs after the step of curing of the flowable curable material in the pour receiving cavity.

12. The method of claim 1, wherein the temporary contact holder comprises one or more alignment elements that are configured to engage corresponding one or more alignment elements of the first end of the connector housing.

13. The method of claim 1, wherein the connector housing has a cylindrical shape and the pour receiving cavity extends generally between a middle of the connector housing and the second end thereof.

14. An electrical connector made according to the steps of claim 1.

15. A method of making an electrical connector, comprising the steps of:

inserting one or more contacts into a temporary contact holder prior to removably coupling the temporary contact holder to a connector housing, the temporary contact holder configured to temporarily hold the one or more contacts in an orientation such that the one or more contacts are arranged in a ready position for mating with a complementary connector;

placing a front end of a connector housing over at least a portion of the temporary contact holder, thereby creating a pour receiving cavity inside of the connector housing , wherein mating end portions of the one or more contacts held in the temporary contact holder extend through the pour receiving cavity in a ready position for mating with a complementary connector;

sealing the connector housing to the temporary contact holder;

after sealing the connector housing to the temporary contact holder, adding a flowable curable material into a top end of the connector housing and into the pour receiving cavity to at least partially fill the pour receiving cavity and surround at least part of the one or more contacts that extend through the pour receiving cavity with termination contacts ends of the one or more contacts being exposed; and removing the temporary contact holder from the front end of the connector housing, thereby leaving mating contact ends of the one or more contacts exposed in the ready position for mating.

16. The method of claim 15, wherein the step of sealing the connector housing to the temporary contact holder includes compressing a sealing member between the connector housing and the temporary contact holder.

17. The method of claim 16, wherein the sealing member forms part of the temporary contact holder.

18. The method of claim 15, further comprising the step of curing the flowable curable material that has been added into the pour receiving cavity; and removing the temporary contact holder from the connector housing after the flowable curable material is cured.

19. The method of claim 15, wherein the step of adding the flowable curable material into the pour receiving cavity includes pouring or injecting the flowable curable material into the pour receiving cavity.

20. The method of claim 15, wherein the flowable curable material is dielectric, conductive, or semi-conductive.

21. An electrical connector formed by the steps of claim 15.

22. A method of making an electrical connector, comprising the steps of:

selecting a connector housing for the electrical connector, the connector housing having opposite first and second ends;

inserting one or more contacts into a temporary contact holder prior to removably coupling the temporary contact holder to a connector housing, the temporary contact holder configured to temporarily hold the one or more contacts in an orientation such that the one or more contacts are arranged in a ready position for mating with a complementary connector;

removably coupling the first end of the connector housing over the at least a portion of the temporary contact holder in an interference fit, thereby creating a pour receiving cavity inside of the connector housing between the first and second ends thereof;

sealing the connector housing to the temporary contact holder when removably coupling the first end of the connector housing with the temporary contact holder;

after sealing the connector housing to the temporary contact holder, adding a flowable curable material into a top end of the connector housing and into the pour receiving cavity to at least partially fill the pour receiving cavity and surround at least part of the one or more contacts that extend through the pour receiving cavity with termination contacts ends of the one or more contacts being exposed; and removing the temporary contact holder from the first end of the connector housing, thereby leaving mating contact ends of the one or more contacts exposed in the ready position.

23. The method of claim 22 further comprising the step of molding the temporary contact holder such that the at least a portion of the temporary contact holder is sized and shaped to be tightly received in the first end of the connector housing.

24. The method of claim 23, wherein the step of sealing the connector housing to the temporary contact holder includes compressing a sealing member between the connector housing and the temporary contact holder.

25. The method of claim 22, further comprising the step of curing the flowable curable material that has been added into the pour receiving cavity; and removing the temporary contact holder from the connector housing after the flowable curable material is cured.

26. The method of claim 25, wherein the step of adding the flowable curable material into the pour receiving cavity includes pouring or injecting the flowable curable material into the pour receiving cavity.

27. The method of claim 22, further comprising the step of reusing the contact holder to make another electrical connector.

28. The method of claim 22, wherein the termination contact ends of the one or more contacts extend outside of the connector housing.

* * * * *